(12) United States Patent
Glucksman et al.

(10) Patent No.: US 6,719,450 B2
(45) Date of Patent: Apr. 13, 2004

(54) PROCESSING TOOL ATTACHMENTS FOR A FOOD MIXING DEVICE

(75) Inventors: Dov Z. Glucksman, Wenham, MA (US); Gary P. McGonagle, Lynn, MA (US); Laura J. Nickerson, Andover, MA (US); Frank A. Brady, Blackhawk, CA (US)

(73) Assignee: Bonjour, Incorporated, Pacheco, CA (US)

( * ) Notice: Subject to any disclaimer, the term of this patent is extended or adjusted under 35 U.S.C. 154(b) by 47 days.

(21) Appl. No.: 10/126,221

(22) Filed: Apr. 19, 2002

(65) Prior Publication Data

US 2003/0198124 A1 Oct. 23, 2003

(51) Int. Cl.⁷ .................................................. B01F 7/16
(52) U.S. Cl. ........................................ 366/129; 366/601
(58) Field of Search .......................... 366/129, 197, 366/601, 206, 251, 316, 325.6; 200/16 C; 388/936

(56) References Cited

U.S. PATENT DOCUMENTS

| | | | | |
|---|---|---|---|---|
| 1,489,182 A | * | 4/1924 | Weinberg | 366/129 |
| 2,042,176 A | * | 5/1936 | Hausman | 366/251 |
| 4,141,779 A | * | 2/1979 | Hill et al. | 117/30 |
| 4,530,606 A | * | 7/1985 | Hopkins et al. | 366/129 |
| 4,575,255 A | * | 3/1986 | Kafka | 366/129 |
| 4,850,699 A | | 7/1989 | Rebordosa | |
| 5,316,382 A | | 5/1994 | Penaranda et al. | |
| 5,360,170 A | | 11/1994 | Cartellone | |
| 5,366,286 A | | 11/1994 | Rüttimann | |
| 5,368,384 A | | 11/1994 | Duncan et al. | |
| 5,482,367 A | | 1/1996 | Khan et al. | |
| 5,498,757 A | | 3/1996 | Johnson et al. | |
| 5,810,472 A | | 9/1998 | Penaranda et al. | |
| 5,836,684 A | | 11/1998 | Safont et al. | |
| D408,214 S | | 4/1999 | Cousins | |
| 5,912,039 A | | 6/1999 | Browne | |
| 5,939,122 A | | 8/1999 | Brady | |
| 5,952,032 A | | 9/1999 | Mordini et al. | |
| 5,972,043 A | * | 10/1999 | Galvan et al. | 366/206 |
| 6,283,625 B2 | | 9/2001 | Frankel et al. | |
| 6,293,187 B1 | | 9/2001 | Zils | |
| 6,293,691 B1 | | 9/2001 | Rebordosa et al. | |
| 6,575,616 B2 | * | 6/2003 | D'Agostino | 366/316 |

* cited by examiner

Primary Examiner—Tony G. Soohoo
(74) Attorney, Agent, or Firm—Morrison & Foerster LLP

(57) ABSTRACT

The present invention generally discloses processing tools for attachment to a hand-held blender. The processing tools are uniquely designed for realizing a perfect consistency for specialty foodstuffs. Also, the invention sets forth an easy attachment mechanism for securing a removable processing tool to a hand held blender. Furthermore, a container for use with a hand-held blender is also provided.

9 Claims, 12 Drawing Sheets

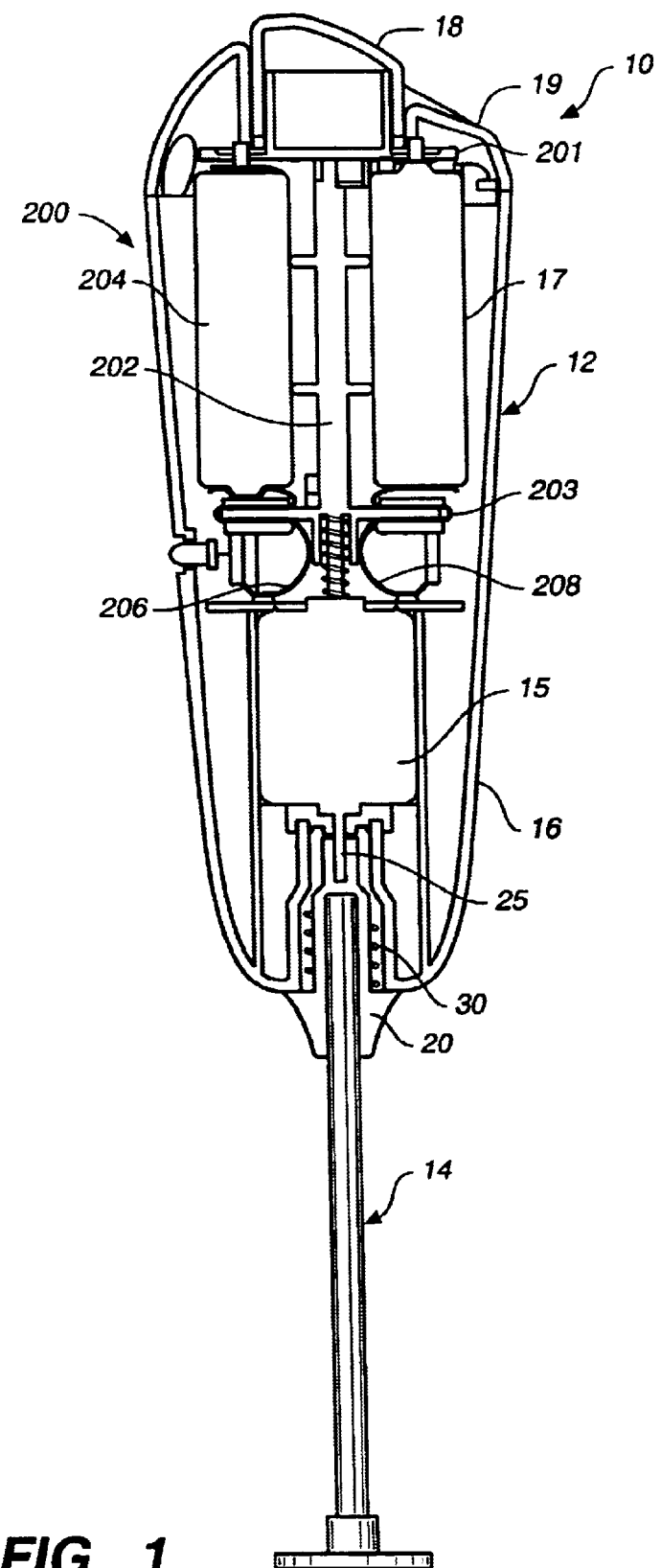
FIG._1

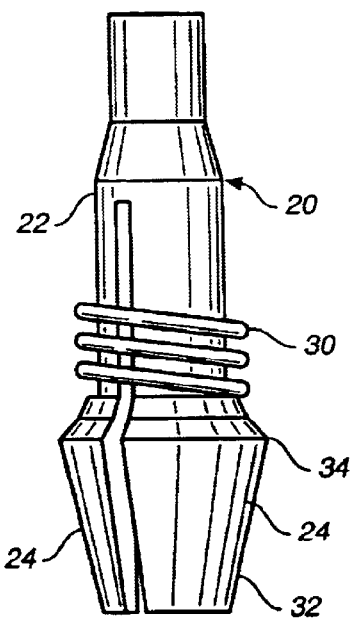
FIG._2
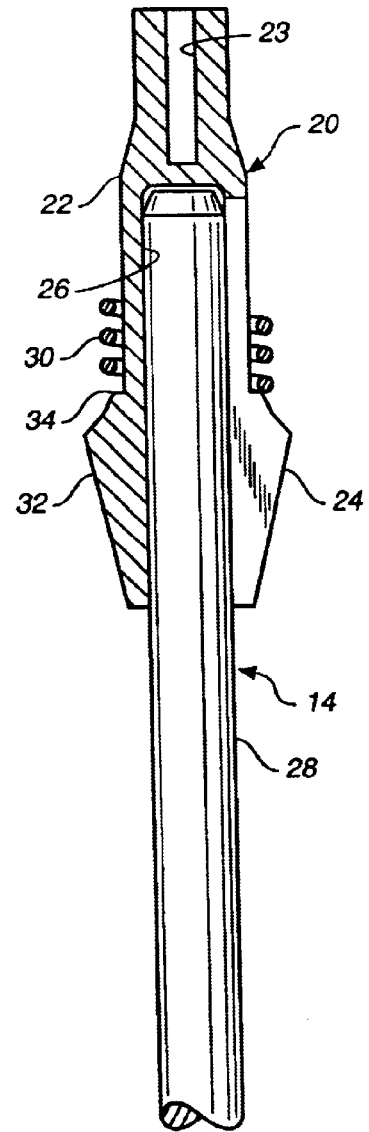
FIG._4
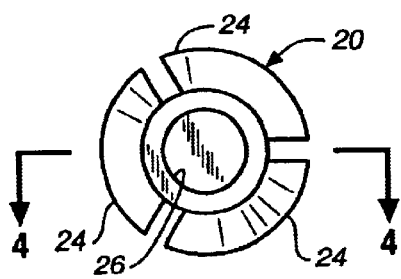
FIG._3

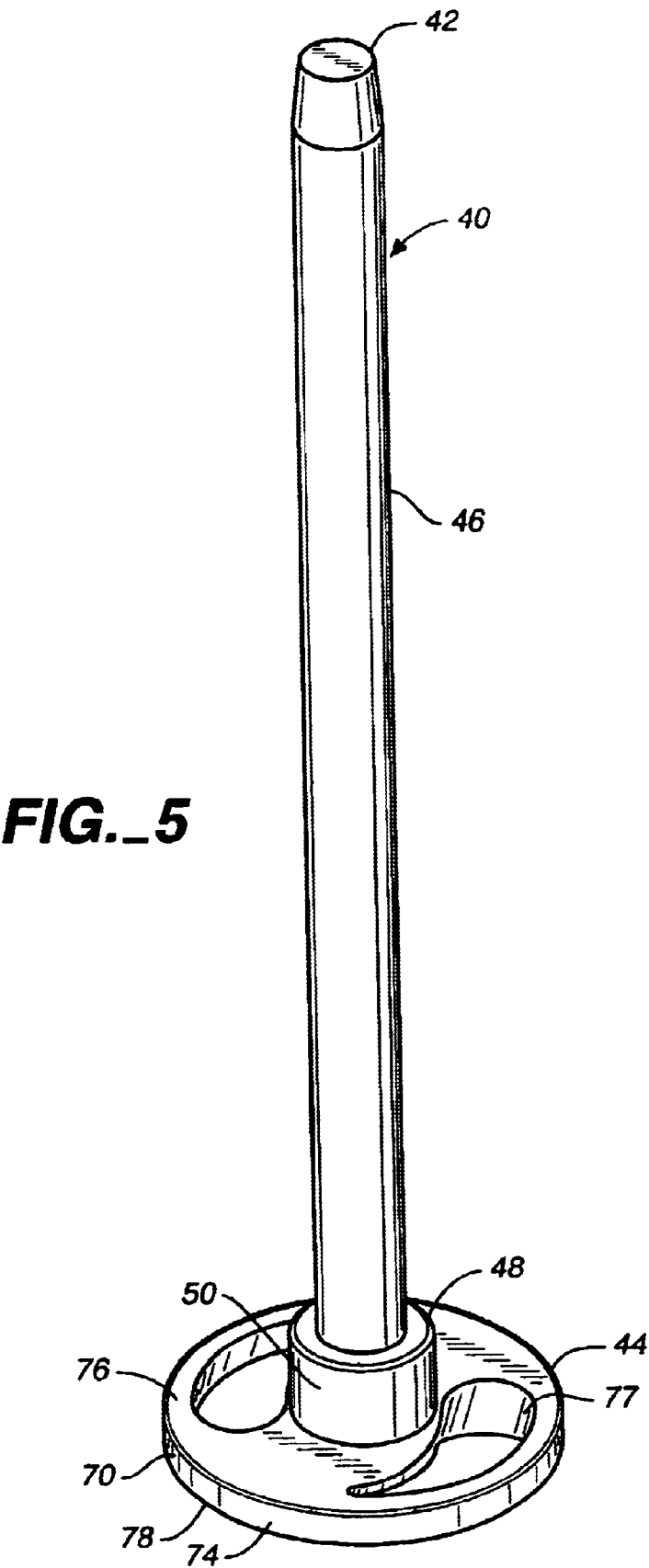
FIG._5

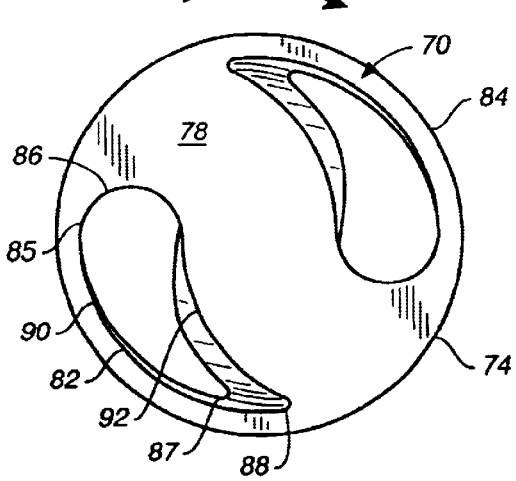
FIG._6
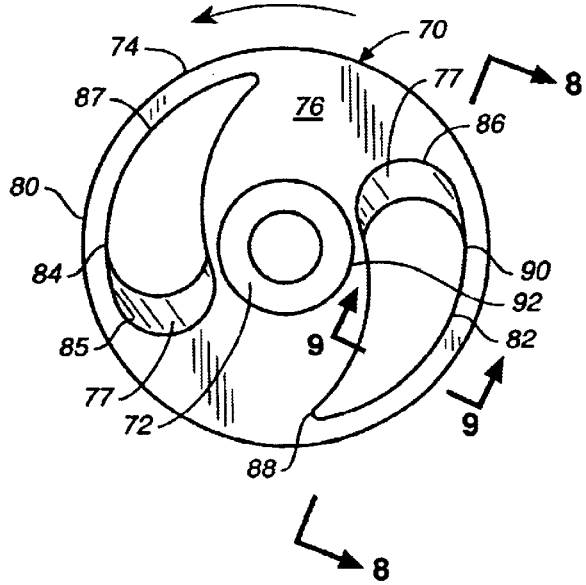
FIG._7
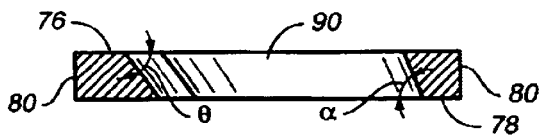
FIG._8
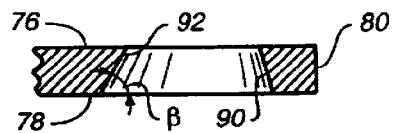
FIG._9

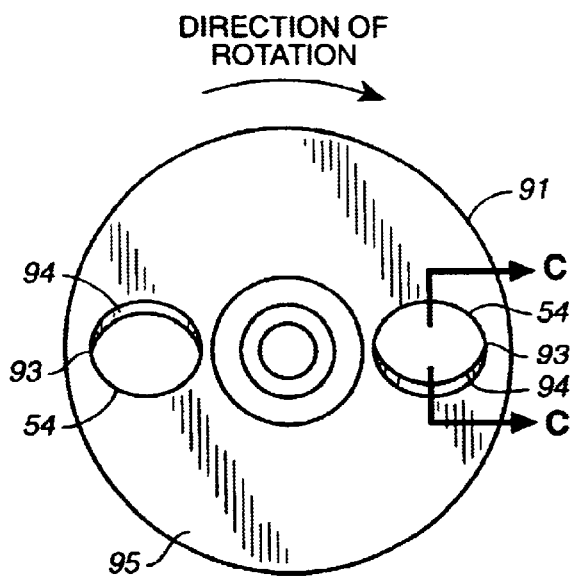
FIG._10A
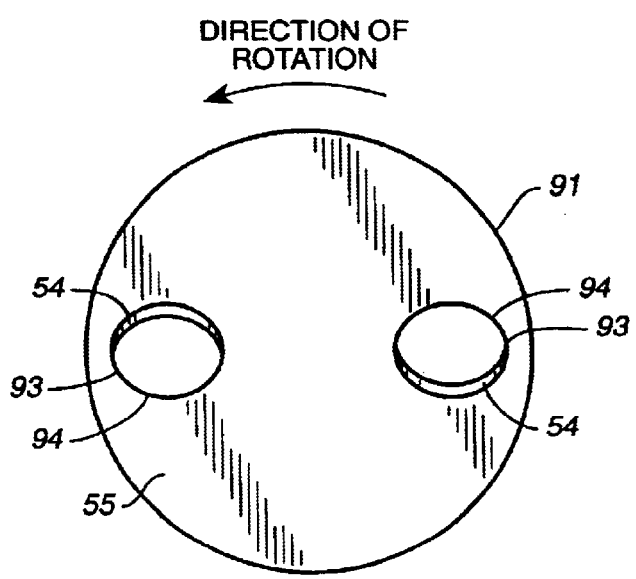
FIG._10B
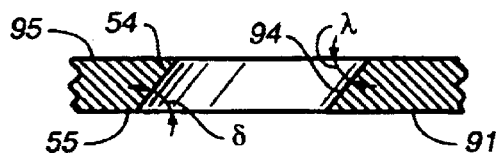
FIG._10C

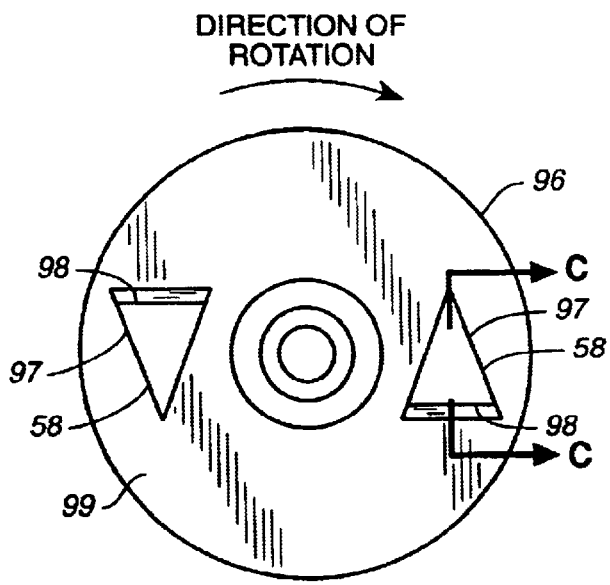
FIG._11A
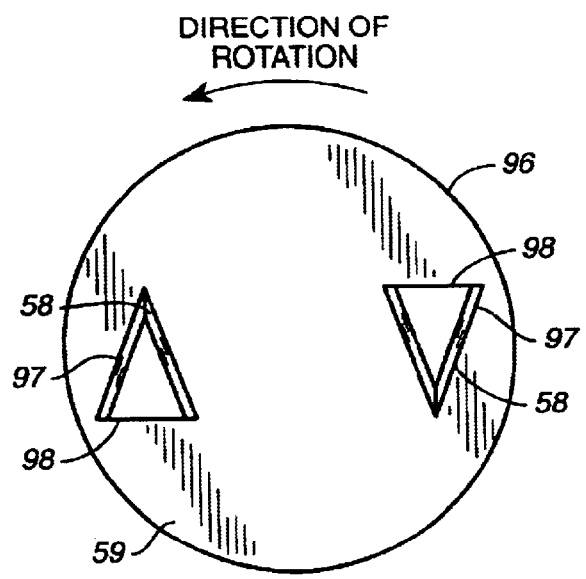
FIG._11B
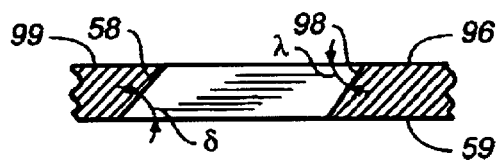
FIG._11C

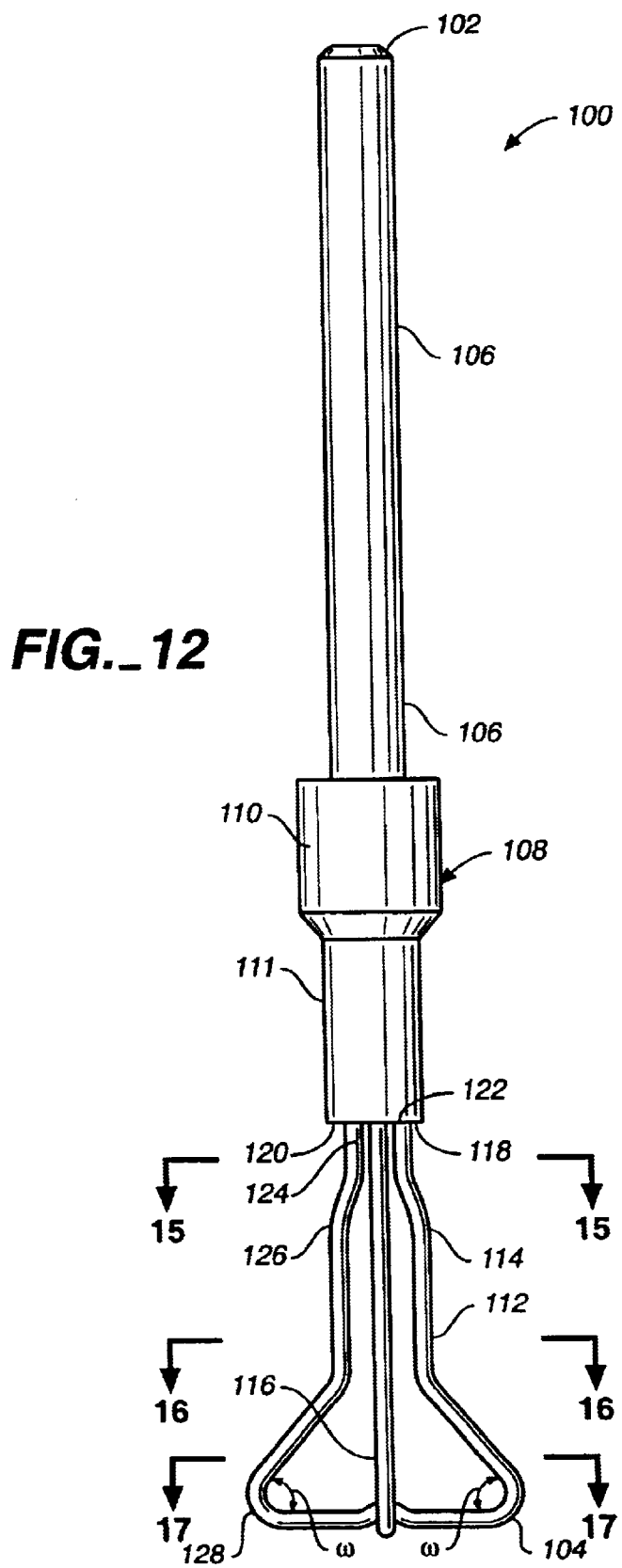
FIG._12

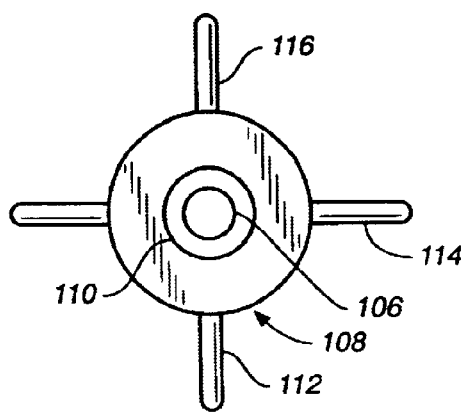
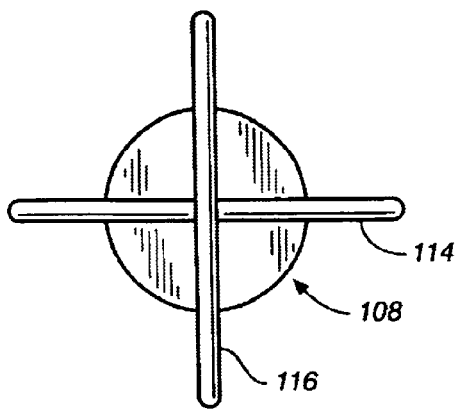
FIG._13  FIG._14
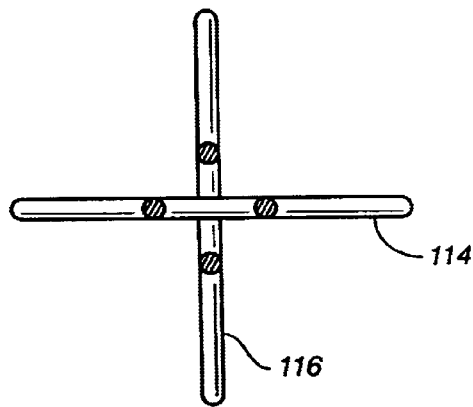
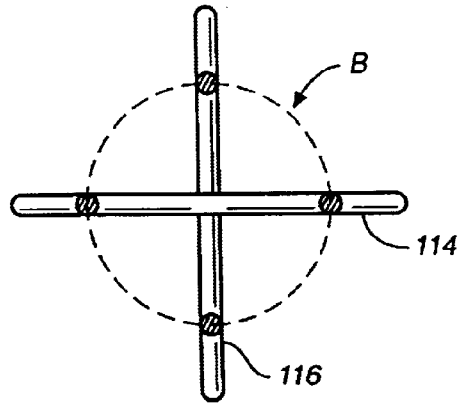
FIG._15  FIG._16
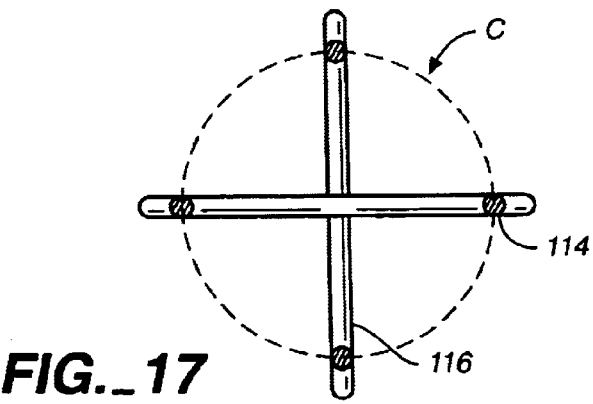
FIG._17

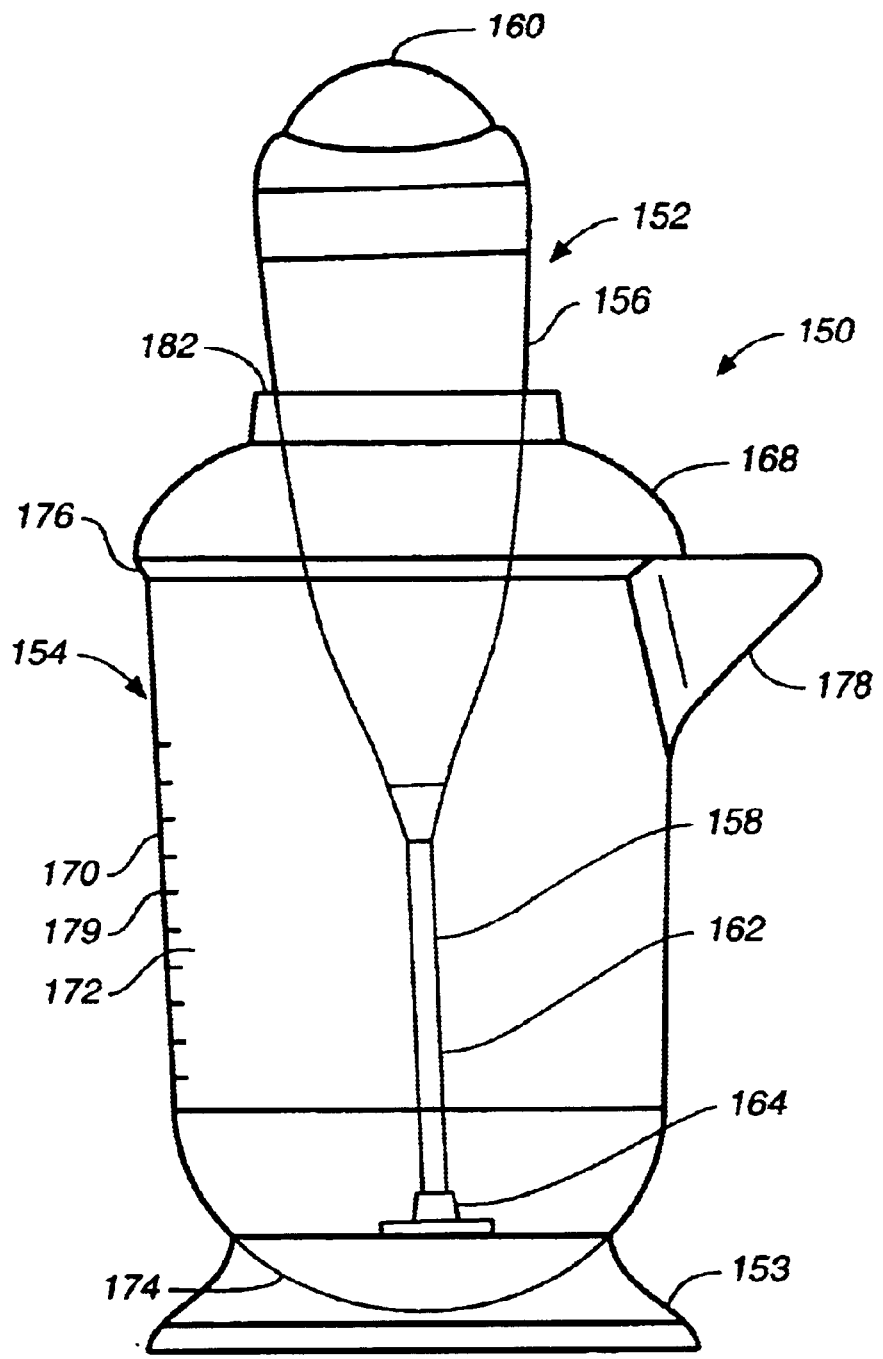
FIG._18

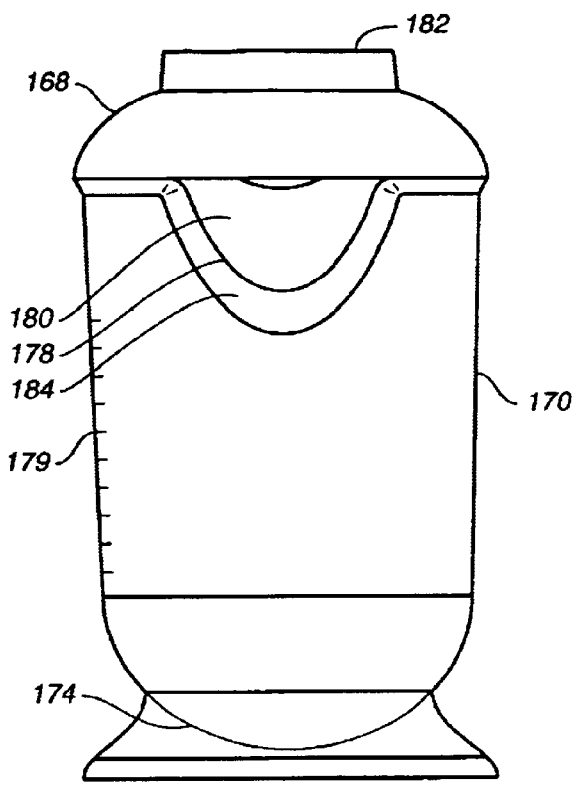
FIG._19
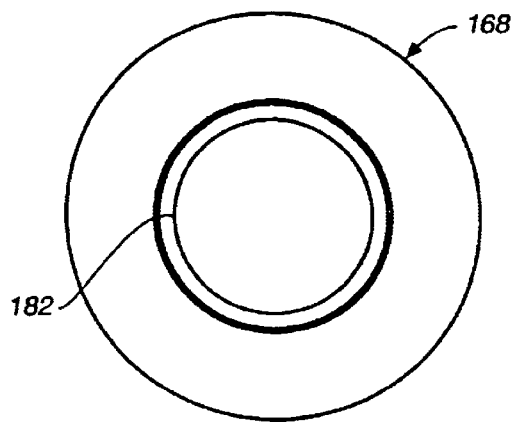
FIG._20
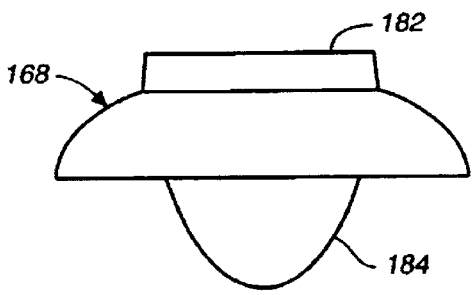
FIG._21

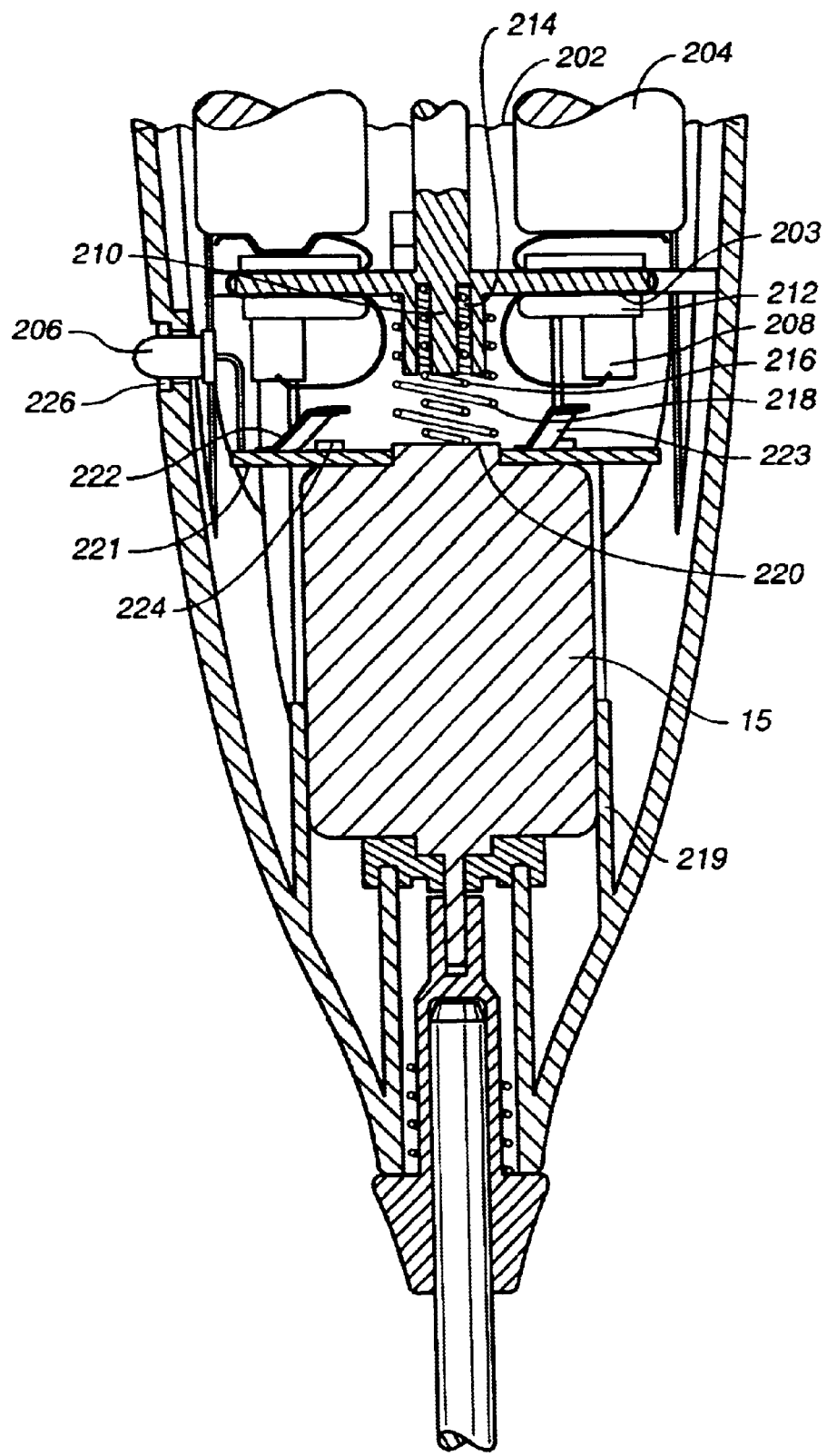
FIG._22

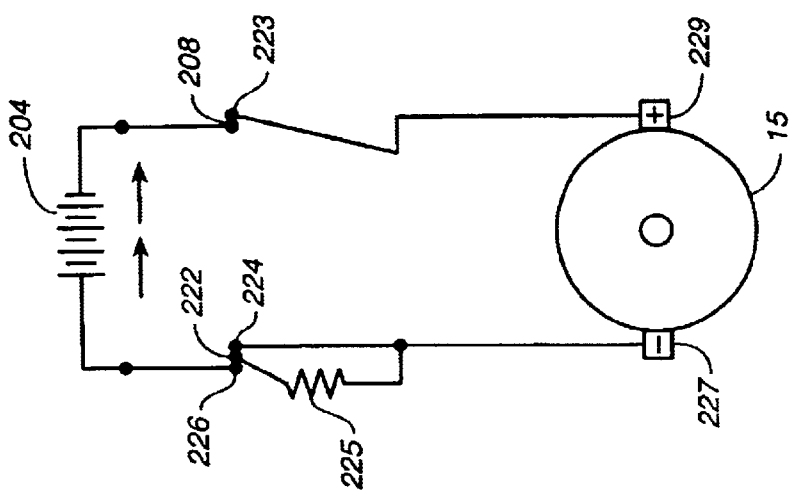
FIG._23C
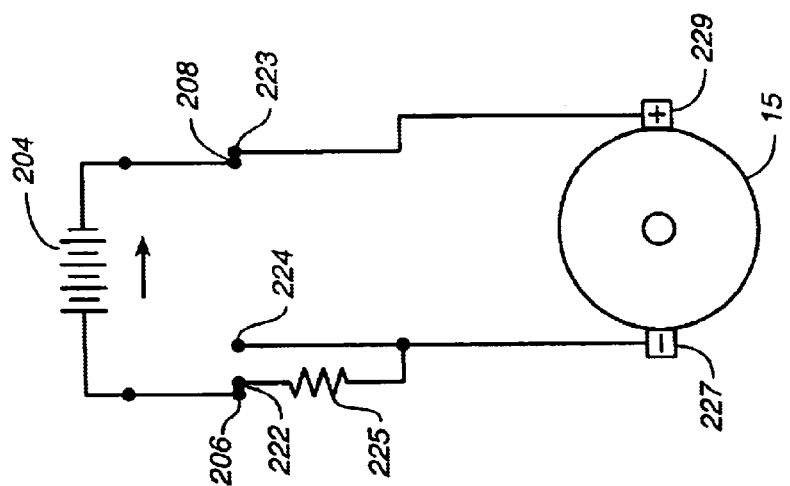
FIG._23B
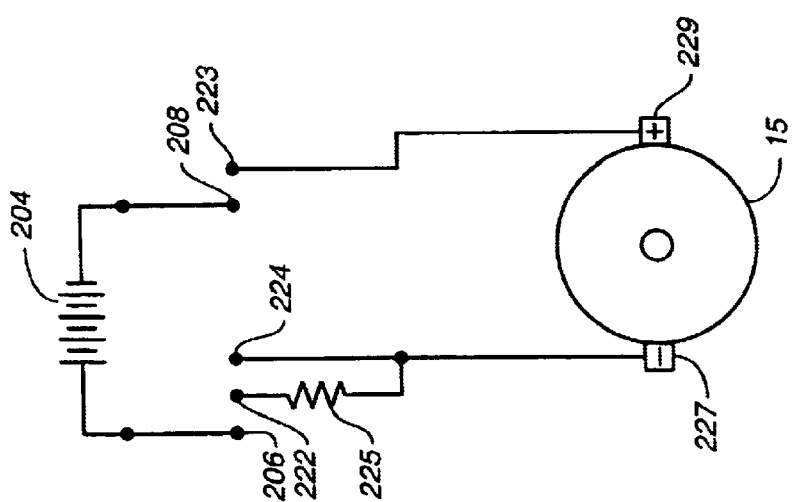
FIG._23A

PROCESSING TOOL ATTACHMENTS FOR A FOOD MIXING DEVICE

FIELD OF INVENTION

This invention relates generally to mixing devices, and more particularly to processing tool attachments for a hand-held blender for mixing foodstuffs and to a container for use with a hand-held blender.

BACKGROUND

Hand-held blenders are popular kitchen appliances for use with various foodstuffs. They provide an easy and convenient way of folding, stirring, mixing, combining, blending, whipping, emulsifying, homogenizing and beating various substances. Relatively small hand-held blenders do not consume valuable counter space and are conveniently employed on crowded kitchen counters. Battery operated hand-held blenders that do not require proximity to electric sockets and do not have interfering electric cords further facilitate the preparation of foods whether it be at home, office, or restaurant. In addition to making cooking more enjoyable, the ability to pull out a hand held blender to mix some protein powder into a beverage, for example, or to foam milk into a fluffy yet firm foam for a perfect cup of cappuccino, makes it possible to enjoy favorites more often.

A typical hand-held blender includes an elongated, tubular housing shaped to comfortably fit in a person's hand. The blender includes a processing tool having a working shaft. The working shaft is connected to and rotatably driven by an electric motor located within the housing that is activated by the push of a actuator on the housing. Some blenders have multiple buttons that correspond with different rotational speeds of the motor. Sometimes the perfect consistency for a particular beverage begs for a particular processing tool. Processing tools that are detachable from the housing allow the user to interchange processing tools for the specialized processing of foodstuffs. A particular processing tool is sometimes more suitable for a particular food processing function and the required consistency. Particular processing tools having unique designs help realize the perfect processing function and the required consistency for a variety of recipes.

Also, a removable processing tool is desirably attached to the driving motor in a manner such that the tool does not separate from the motor when the two are coupled either at high rotational speed, or after prolonged rotation. Typically, the shaft of the processing tool is inserted into a chuck that is firmly attached to the motor shaft. It is desirable that such a tool be insertable and removable quickly and easily without undue worry about its proper securement. An attachment mechanism securely attaches a removable and interchangeable processing tool to the housing portion of a hand-held blender.

SUMMARY OF INVENTION

In accordance with one aspect of the invention, there is provided a blender comprising a processing tool having a shaft and a body. The body includes a motor and a collet configured to couple the processing tool to the motor. The collet is connected to the motor at a first end. The collet includes a collet body and at least two extensions forming a shaft-receiving portion at a second end. The shaft of the processing tool is received within the shaft-receiving portion forming a friction-fit engagement to secure the processing tool.

In accordance with another aspect of the invention, there is provided a processing tool comprising a shaft configured to couple to a blender at a first end and a body connected to the shaft at a second end. The body includes a working portion. The working portion has a top surface and a bottom surface interconnected by a sidewall. The working portion includes at least a first opening extending between the top surface and the bottom surface. The first opening includes a leading end interconnected to a trailing end. At least a portion of the trailing end forms an angle with the bottom surface that is less than 90 degrees.

In accordance with another aspect of the invention, there is provided a processing tool for a blender comprising a shaft configured to couple to a blender at a first end and a body connected to the shaft at a second end. The body includes a working portion. The working portion includes a wire frame having an upper portion and a lower portion. The upper portion is closer to the first end than the second portion. The wire frame defines a cross-sectional area at the upper portion that is smaller than the cross-sectional area defined by the wire frame at the lower portion.

In accordance with another aspect of the invention, there is provided a container for use with a hand-held blender that has a processing tool attached thereto. The container includes a sidewall interconnected to a base. The sidewall and base define an interior and an opening. A lid is adapted to be received in the opening. The lid includes a blender opening configured to insert the hand-held blender therethrough and into the container interior. The container is adapted to rest the blender against the lid at the blender opening such that the processing tool of the blender is spaced from the base.

In accordance with another aspect of the invention there is provided a blender comprising a processing tool, a housing and a motor located within the housing. The processing tool is coupled to the motor to be rotatably driven by the motor. The motor includes a first motor terminal and a second motor terminal. The blender also includes a battery cartridge located within the housing. The battery cartridge is adapted to receive at least one battery. The battery cartridge has a first end and a second end. The battery cartridge includes a first cartridge terminal and a second cartridge terminal at the second end. An actuator coupled to the first end of the battery cartridge. The blender further includes a circuit board located between the motor and the battery cartridge. The circuit board is adapted to electrically connect to the at least one battery to power the motor. The circuit board includes a resilient first contact, a resilient second contact, a third contact, and at least one resistor. The resilient first contact is electrically connected to the first motor terminal through the resistor. The resilient second contact is electrically connected to the second motor terminal. The third contact is electrically connected to the first motor terminal. The resilient first contact is located above the third contact. The blender further includes a first spring attached to the battery cartridge. The first spring extends from the second end of the battery cartridge. The battery cartridge is spaced from the circuit board by the first spring such that the blender is not activated. Depressing the actuator compresses the first spring to a first position in which the first cartridge terminal and the second cartridge terminal are in contact with the resilient first contact and resilient second contact, respectively, to activate the motor to rotate the processing tool at a first speed. Depressing the actuator further compresses the first spring further to a second position in which the first resilient contact is flexed to contact the third contact to activate the motor to rotate the processing tool at a second speed. The second speed is greater than the first speed due to the resistor being shunted out of the circuit when the resilient first contact contacts the third contact.

BRIEF DESCRIPTION OF THE DRAWINGS

The invention will become apparent upon reading the following detailed description and upon reference to the drawings in which:

FIG. 1 is a cross-section view of an example blender;

FIG. 2 is a side elevation view of an example collet;

FIG. 3 is a bottom plan view collet of the FIG. 2;

FIG. 4 is a side cross-section view of the collet and shaft;

FIG. 5 is a perspective view of an example processing tool;

FIG. 6 is a bottom plan view of the processing tool of FIG. 5;

FIG. 7 is a top plan view of the processing tool of FIG. 5;

FIG. 8 is a cross-section view taken along line 8—8 of FIG. 7 of the processing tool of FIG. 5;

FIG. 9 is a cross-section view taken along line 9—9 of FIG. 7 of the processing tool;

FIG. 10A is a top plan view of a second example of a processing tool;

FIG. 10B is a bottom plan view of the processing tool of FIG. 10A;

FIG. 10C is a partial cross-section view taken along line C—C of FIG. 10A of the processing tool of FIG. 10A;

FIG. 11A is a top plan view of a third example of a processing tool;

FIG. 11B is a bottom plan view of the processing tool of FIG. 11A;

FIG. 11C is a partial cross-section view taken along line C—C of FIG. 11A of the processing tool of FIG. 11A;

FIG. 12 is a side elevation view of a fourth example of a processing tool;

FIG. 13 is a top plan view of the processing tool of FIG. 12;

FIG. 14 is a bottom plan view of the processing tool of FIG. 12;

FIG. 15 is a cross-section view of the fourth example processing tool taken along line 15—15 of FIG. 12 of the processing tool;

FIG. 16 is a cross-section view of the fourth example processing tool taken along line 16—16 of FIG. 12 of the processing tool;

FIG. 17 is a cross-section view of the fourth example processing tool taken along line 17—17 of FIG. 12 of the processing tool;

FIG. 18 is a side elevation view of an example blender and processing bowl system;

FIG. 19 is a side elevation view of the processing bowl of the FIG. 18 system;

FIG. 20 is a top plan view of the lid of the processing bowl of the FIG. 18 system;

FIG. 21 is a side elevation view of the lid of the processing bowl of the FIG. 18 system;

FIG. 22 is a partial cross-section view of a portion of the blender of the FIG. 18 system;

FIG. 23A is an equivalent circuit diagram illustrating an off configuration of an example two-speed activation mechanism;

FIG. 23B is an equivalent circuit diagram illustrating a low-speed configuration of the example two-speed activation mechanism; and FIG. 23C is an equivalent circuit diagram illustrating a high-speed configuration of the example two-speed activation mechanism.

DETAILED DESCRIPTION

Referring now to FIG. 1, there is shown a hand-held blender 10. The blender 10 includes a body 12 coupled to a processing tool 14. The body 12 includes an elongated, tubular housing 16 shaped to comfortably fit in a person's hand. A motor 15 is located within the housing 16. The motor 15 is powered by batteries 17 also located within the housing 16. Alternatively, the motor is powered by an alternating current via an electric cord. The motor 15 is manually actuated by a button or actuator 18 conveniently located at the top of the housing 16 that sets the motor 15 into operation at one of at least one speed.

The blender according to the invention further includes a collet 20. The collet 20 is adapted to receive one end of the processing tool 14. The collet 20 couples the processing tool 14 to the motor 15 that rotatably drives the collet 20 and processing tool 14. The collet 20 is shown in FIGS. 2–4 and will now be described.

With particular reference to FIGS. 1–4, the collet 20 includes a body 22 at least two fingers or extensions 24 and a spring 30. The variation shown here includes three extensions 24. The body 22 of the collet 20 includes a bore 23 configured to receive a drive shaft 25 of the motor 15. The fingers or extensions 24 extend from the body 22 to form a shaft-receiving portion 26 that is adapted to grip a shaft 28 of a processing tool 14. The inner surface of each finger 24 is shaped to substantially conform to the outer surface of the shaft 28 such that the three fingers 24 in conjunction with one another substantially encompass the shaft 28. Each of the fingers 24 has an end portion 32. The end portion 32 is tapered and includes a shoulder 34.

The collet 20 firmly secures the processing tool 14 and transfers to the processing tool 14 the rotational torque generated by the motor shaft 25 which is firmly located in the bore 23 of the collet 20. The three fingers 24 of the collet 20 are stressed in an inwardly radial direction by the spring 30. The spring 30 is made of a metal wire wound in a helical fashion. The relaxed diameter of the spring 30 is smaller than the outer diameter of the collet 20 on which the spring 30 is seated. When the spring 30 is forcefully pushed into its place on the collet 20, the three collet fingers 24 are forced to move inwardly in a radial direction. When the shaft 28 of the processing tool 14 is inserted into the collet 20, the shaft 28 pushes the fingers 24 outwardly against the force of the spring 30. The expanded spring 30 applies a radial force on the fingers 24 which in turn transfer that force to the shaft 28 thereby creating a friction fit engagement that maintains the shaft 28 in alignment with the collet 20 and the motor shaft 25. Additionally, the friction fit generates sufficient frictional force to transfer the motor torque to the processing tool 14.

Referring now to FIGS. 5–9, there is depicted a processing tool 40 having a first end 42 and a second end 44. The processing tool 40 includes a shaft 46 and a body 48. The body 48 is attached to the shaft 46 at the second end 44. The first end 42 is adapted for engagement with a collet 20 of the type described above, although the invention is not so limited. The body 48 includes a shaft-receiving portion 50 integrally formed with a working portion 70. The working portion 70 is approximately 0.080 inches to 0.150 inches in thickness and includes a top surface 76 and a bottom surface 78 interconnected by a sidewall 74. The top surface 76 is substantially parallel to the bottom surface 78. The working portion 70 is substantially circular in shape and has a diameter of approximately 0.750 inches to approximately 1.250 inches. The shaft 46 is attached to the body 48 by being received in the shaft-receiving portion 50 and affixed therein with, for example, an adhesive, a friction fit, or by insert molding. The body 48 is preferably made from a plastic material such as Polyamid.

As can be seen in FIGS. 5–9, the working portion 70 is a substantially circular disc having a pair of openings—a first opening 82 and a second opening 84. Both openings 82 and 84 are located substantially opposite from each other. Since the openings 82 and 84 are substantially identical, only one will be described in detail. Although the working portion 70 is depicted with two openings, the invention is not so limited and any number of openings is possible such that at least one opening is employed.

The processing tool 40 is adapted to rotate in the direction shown by the arrow in FIGS. 6 and 7 when activated. Still referencing FIGS. 5–9, each opening includes a leading end 85 and a trailing end 87 with respect to the direction of rotation. At least a portion of the leading end 85 is sloped to form an angle with respect to the top surface 76 that is less than 90 degrees. At least a portion of the trailing end 87 is sloped to form an angle with respect to the bottom surface 78 that is less than 90 degrees. The portion of the trailing end 87 that is sloped to be less than 90 degrees with respect to the bottom surface forms a vane portion or impeller that directs foodstuffs and air adjacent to the top surface 76 to the other side and adjacent the bottom surface 78 when the processing tool 40 is activated to rotate. Similarly, the portion of the leading end 85 that is angled less than 90 degrees with respect to the top surface 76 aids in directing foodstuffs and air downwardly from adjacent the top surface 76 to adjacent the bottom surface 78. This impeller action of the processing tool 40 is accomplished by a various types openings having different shapes and sizes as will be made clear hereinbelow.

In the variation shown in FIGS. 5–9, the opening 82 includes a first end 86 and a second end 88 interconnected by an outer side 90 and an inner side 92. The first end 86 is curved and extends between the top surface 76 and the bottom surface 78 at an angle θ with respect to the top surface 76. The angle θ is defined between the top surface 76 and the surface 77 that is interior to the opening 82. As can be seen in FIG. 8, the angle θ that the first end 86 forms with respect to the top surface 76 is less than 90 degrees, and preferably approximately from 30 and 60 degrees. In one variation, the angle θ is not constant along the entire first end 86 but varies from approximately 30 and 90 degrees. The first end 86 serves as the leading end 85 in the rotation.

The outer side 90 of opening 82 is curved. When viewed from the top surface 76 or the bottom surface 78, the outer side 90 is substantially parallel with respect to the sidewall 74 as shown in FIGS. 6 and 7. In one variation, the outer side 90 extends between the top surface 76 and the bottom surface 78 such that the outer side 90 is substantially perpendicular with respect to either the top surface 76 or bottom surface 78. In another variation, the outer side 90 extends between the top surface 76 and the bottom surface 78 at an angle α with respect to the bottom surface 78 as shown in FIG. 8. The angle α is defined between the bottom surface 78 and the surface that opens to the interior of the opening. In one variation, angle α is less than 90 degrees, and preferably approximately from 80 degrees and 85 degrees. In one variation, the angle α is not constant along the entire length of the outer side 90 but varies from approximately 80 degrees and 90 degrees along the length of the outer side 90 such that the angle α is approximately 90 degrees at the first end 86 and transitions to approximately 80 degrees at the second end 88.

The inner side 92 of opening 82 is curved. In one variation, the inner side 92 extends between the top surface 76 and the bottom surface 78 such that the inner side 90 is substantially perpendicular with respect to either the top surface 76 or bottom surface 78. In another variation, the inner side 92 extends between the top surface 76 and the bottom surface 78 at an angle β with respect to the bottom surface 78 as shown in FIG. 9. In one variation, angle β is less than 90 degrees, and preferably approximately from 60 degrees and 90 degrees. In one variation, the angle β is not constant along the entire length of the inner side 92 but varies from approximately 60 degrees and 90 degrees such that the angle β is approximately 90 degrees at the first end 86 and transitions to approximately 60 degrees at the second end 88. Generally, the opening 82 is wider at the first end 86 and narrows towards the second end 88. Together the outer side 90 and inner side 92 include at least a portion that is angled less than 90 degrees with respect to the bottom surface 78. In this variation both the outer side 90 and the inner side 92 form the trailing end 87 that acts as a V-shaped vane that opens to at the bottom surface 78 as can be seen in FIG. 6.

With respect to FIGS. 5–9, the shape of the openings 82, 84 may be generally described as being a curved tear-drop or a paisley shape. Together, the pair of openings 82, 84 form a design commonly known as the "yin-yang" symbol to invoke the feeling of harmony. When the processing tool is attached to the motor and the processing tool is immersed into liquid, the motor is engaged and the shaft rotates. The processing tool is adapted for rotation such that the first end of each of the openings leads in the rotation and the first end of the first opening trails the second end of the second opening. This direction of rotation is illustrated by the directional arrow in FIGS. 6 and 7. When the processing tool rotates, the working portion 70 creates a vortex such that when the vortex is completely established, at least a portion of the top surface 76 is contact with air. The first end 86 is shaped so that it acts like a vane, scooping air at the top surface 76 and discharging it on the bottom surface 78, thereby mixing the air with the liquid. Therefore, the working portion 70 serves as an impeller. This type of design for the working portion 70 is particularly effective for frothing or foaming chilled milk, creating a froth or foam that is firm and fluffy and commonly suitable for various coffee-type beverages.

Although, the openings 82, 84 of the working portion 70 are illustrated to have tear-drop or paisley shapes, other examples have other shapes. The impeller action of the working portion 70 can be accomplished by openings having a variety of shapes as mentioned above. For example, referring now to FIGS. 10A, 10B and 10C, there is depicted one variation of a working portion 91 having openings 93 that are substantially circular in shape. Each opening 93 includes a leading end 94 and a trailing end 54. At least a portion of the leading end 94 is at an angle λ that is less than 90 degrees with respect to the top surface 95 and preferably approximately between 30 and 60 degrees as shown in FIG. 10C. In one variation, the angle is not constant along the entire length of the leading end 94 but varies to create a smooth transition. The working portion 91 rotates in the direction shown by the arrow in FIG. 10A such that the leading end 94 is the leading edge in the rotation. Referring to FIG. 10B, there is shown a bottom plan view of the working portion 91. At least a portion of the trailing end 54 is at an angle δ that is less than 90 degrees with respect to the bottom surface 55 as shown in FIG. 10C. When rotating, the working portion 91 acts as an impeller that directs foodstuffs and air adjacent to the top surface 95 downwardly through the openings 93 to thoroughly mix the foodstuffs and to thrust air into the mixture.

Referring now to FIGS. 11A, 11B, and 11C, there is shown another example of a working portion 96 having openings 97 that are substantially triangular in shape. Each opening 97 includes a leading end 98 and a trailing end 58. At least a portion of the leading end 98 is at an angle λ that is less than 90 degrees with respect to the top surface 99 and preferably approximately between 30 and 60 degrees. In one variation, the angle is not constant along the entire length of the leading end 98 but varies to create a smooth transition. The working portion 91 rotates in the direction shown by the arrow in FIG. 11A such that the leading end 98 leads in the rotation. Referring to FIG. 11B, there is shown a bottom plan view of the working portion 96. As shown in FIGS. 11B and 11C, at least a portion of the trailing end 58 is at an angle δ that is less than 90 degrees with respect to the bottom surface 59. When rotating, the working portion 96 acts as an impeller that directs foodstuffs and air adjacent to the top surface 99 downwardly through the openings 97 to thoroughly mix the foodstuffs and to thrust air into the mixture. Therefore, as illustrated, the openings having a variety of shapes are within the scope of the invention such that at least a portion of the leading end is angled less than 90 degrees with respect to the top surface and at least a portion of the trailing end is angled less than 90 degrees with respect to the bottom surface. In yet another variation, the opening includes only an angled trailing end.

Referring now to FIGS. 12–17, there is depicted a processing tool 100 having a first end 102 and a second end 104. The processing tool 100 includes a shaft 106 and a body 108. The body 108 is attached to the shaft 106 at the second end 104. The first end 102 of the processing tool 100 is adapted to engage with a collet of the type described above, although the invention is not so limited. The body 108 includes a shaft-receiving portion 110 integral with a wire-receiving portion 111. The shaft 106 is attached to the body 108 by being received in the shaft-receiving portion 110 and affixed therein with, for example, an adhesive, friction fit, or by insert molding. The body 108 is preferably made from a plastic material such as Polyamid. The working portion 112 is preferably made from a stainless steel wire and is secured in the wire-receiving portion 111. The wire-receiving portion 111 includes, for example, four elongated cylindrical openings (not shown) configured to receive four wires of the working portion 112.

The working portion 112 is a wire-frame wisk that is approximately 0.900inches to 1.250 inches in length. The working portion 112 includes a first wire 114 and a second wire 116. The first wire 114 includes a first end 118 and a second end 120 that are connected to the shaft-receiving portion 110. Similarly, the second wire 116 includes a first end 122 and a second end (not shown) that are connected to the wire-receiving portion 111 of the body 108. Together, the first wire 114 and the second wire 116 are shaped such that the working portion 112 includes an upper portion 124, a waist portion 126, and a lower portion 128. In one variation, the working portion 112 includes only a waist portion and a lower portion. The length of the upper portion 124 is approximately 0.150 inches, the length of the waist portion 126 is approximately 0.600 inches, and the length of the lower portion 128 is approximately 0.450 inches.

A cross-section of the upper portion 124 is depicted in FIG. 15. It can be seen that the spacing between the wires is kept relatively small. As mentioned above, the portion of the wisk is designed to be connected to the wire-receiving portion 111. Since it is desirable to keep the wire-receiving portion 111 as slim as possible in order to not interfere with the operation of the wisk, the distance between the wires in the upper portion 124 is minimized as much as possible.

A cross-section of the waist portion 126 is depicted in FIG. 16. This cross-section of FIG. 16 illustrates an area B that is encompassed and defined by the virtual circle formed by the first and second wires 114, 116 at the waist portion 126 as they rotate. Area B is substantially constant along the length of the waist portion 126. Area B is approximately 0.057 inches$^2$ to approximately 0.060 inches$^2$.

A cross-section of the lower portion 128 is depicted in FIG. 17. The cross-section of FIG. 17 illustrates an area C that is encompassed and defined by the virtual circle formed by first and second wires 114, 116 at the lower portion 128 as they rotate. As can be seen in FIG. 12, the lower portion 128 does not have a constant area C. Instead, area C increases with distance towards the second end 104. The lower portion 128 of first and second wires 114, 116 are formed in a trapeze shape with lateral angles 107 such that the wire frame of the lower portion 128 is similar to a truncated pyramid in shape. The area C at the widest point of the pyramid is approximately 0.48 inches$^2$ to approximately 0.50 inches$^2$. As can be seen in FIGS. 16–17, the area B of the waist portion 126 is smaller relative to the area C of the lower portion 128. In one variation of the working portion 112, there is only a waist portion 126 and a lower portion 128 such that the waist portion 126 directly fits into the wire-receiving portion 111 of the body 108.

The working portion 112 provides a wire frame that is useful for frothing warm milk. When at least partially immersed into a liquid product, the processing tool 100, when rotatingly engaged induces air into the liquid. Air is induced into the liquid by the working portion 112. In particular, air and foodstuffs is channeled from the waist portion 126 downwardly into the lower portion 128. The virtual cylinder of cross-section B along the length of the waist portion 126 acts as an airshaft communicating with the virtual truncated cone of varying cross-section C of the lower portion 128. This working portion 112 is particularly advantageous because the induction of air into the liquid is accomplished with minimal spinning of the liquid because of the wire frame construction. Furthermore, frothing or foaming of the liquid takes place at the lowest possible point of immersion without dragging the entire body of milk along with the rotating processing tool 100. It should be noted that the diameter of the wires is approximately 0.03 inches. These small diameter wires slice through the liquid with relatively minimal drag force, thereby, leaving the body of milk relatively stationary. This action permits the warm milk to foam. If the warm milk were to rotate along with the wisk, then the foam would have been reabsorbed in to the liquid milk due to it being warm. The result would not have been satisfactory, namely very little foam, if any, would have remained.

Referring now to FIGS. 18–21, there is depicted a blender and processing bowl system 150. The blender and processing bowl system 150 includes a hand-held blender 152 and a processing bowl or container 154. The blender 152 includes a body 156 coupled to a processing tool 158. The body 156 includes an elongated, tubular housing shaped to comfortably fit in a person's hand. A motor (not shown) is located inside the body 156. The motor is manually actuated by a actuator 160 conveniently located at the top of the body 156. The processing tool 158 includes a shaft 162 and is removably attached to the body 156. The processing tool 158 includes a working portion 164.

The container 154 includes a sidewall 170 interconnected to a base 174, and a lid 168. The sidewall 170 and base 174 define an interior 172 and an opening 176 of the container 154. The container 154 further includes a stand 153 spout 178 having a spout opening 180. The base 174 of the container 154 is concave with respect to the interior 172 of the container 154. The container 154 further includes markings 179 denoting graduations of fluid volume. For example, markings 179 denoting the number of cups, tablespoons, ounces, pints, teaspoons and milliliters can all be included on the container 154.

The lid 168 is adapted to mate with the container 154 at the opening 176 to substantially cover the opening 176. The lid 168 includes a blender opening 182 and a lip 184 as shown in FIGS. 20–21. The blender opening 182 is adapted to receive a blender 152 as shown in FIG. 18. The lip 184 is adapted to cover the spout opening 180.

The blender and processing bowl system 150 is employed such that foodstuffs are entered into the container 154 via opening 176. Also, the processing bowl 154 is adapted such that foodstuffs can be entered via the blender opening 182 when with the lid 168 is in place on the container 154. Additionally, foodstuffs can be entered via the spout opening 180. In one variation, to enter food via the spout opening 180, the lid 168 is rotated so that the lip 184 does not cover the spout opening 180. The quantity of foodstuffs placed inside the container is measured via the markings 179 on the sidewall 170. The lid 168 is movable with respect to the container 154 such that the user navigates the lip 184 of the lid 168 into a position in which the lip 184 covers the spout opening 180 if so desired. In the variation in which the lid 168 is substantially circular, the lid 168 rotates with respect to the container 154. Thereby, the lip 184 serves to close the spout opening 180 to prevent foodstuffs from escaping the container 154 via the spout 178 especially when the blender 152 is engaged and the processing tool 158 is rotating and mixing the contents of the processing bowl 154. A blender 152 is inserted into the processing bowl 154 through the blender opening 182. The blender opening 182 is adapted to receive the blender 152 such that the body 156 of the blender 152 rests against the lid 168 at the blender opening 182. With the blender 152 resting against the lid 168 at the blender opening 182, the user is free let go of the blender 152. The blender and processing bowl system 150 is adapted such that the blender and processing bowl system 150 will not tip-over when the user leaves the blender 152 unattended. Also, the user does not have to worry about the blender 152 falling or slipping deeper into the processing bowl 154. The lid 168 keeps the blender 152 in place. In fact, the blender and processing bowl system 150 is adapted such that, with the blender 152 resting against the lid 168 at the blender opening 182, the blender 152 is ideally positioned within the processing bowl 154 such that the working portion 164 of the processing tool 158 is spaced from the base 174 by an operable distance of approximately 0.100 inches to approximately 0.200 inches. The user does not have to worry about keeping the blender 152 a particular distance from the base 174 to keep the processing tool 158 in an operable location.

Furthermore, in one variation, at least a portion of the processing tool 158 is positioned within the concavity of the base 174 when the blender 152 rests against the lid 168 at the blender opening 182. In this position, the rotating processing tool 158 in conjunction with the concavity of the base 174 direct foodstuffs upwardly and away from the base 174 to enhance mixing.

In one variation, the processing bowl 154 is adapted such that the lip 184 partially covers the spout opening 180 allowing small amounts of foodstuffs to be entered into the processing bowl 154 via the spout opening 180. In yet another use of the blender and processing bowl system 150, the lid 186 may be rotated away from the spout 178 such that the lip 184 does not cover the spout opening 180, thereby, permitting foodstuffs to be entered into the processing bowl 154. Whether or not the lip 184 is adapted to completely or partially cover the spout opening 180, the blender and processing bowl system 150 permits entry of foodstuff via the spout opening 180 during the blending process with the blender 152 engaged without necessitating the halting or removal of the blender 152. For example, oil or other foodstuffs can be slowly drizzled into the processing bowl 154 via the spout 178 and spout opening 180 while continuing to mix the ingredients in the container 154. The spout 178 serves as a catchment large enough for the entry of foodstuffs. Also, with the blender 152 resting against at least a portion of the lid 168, one can engage the blender 152 with one hand without manually adjusting the height of the blender 152 with respect to the base 174. Hence, the user's other hand is freed to enter ingredients or perform other kitchen tasks.

With reference to FIGS. 1, 22, 23A, 23B and 23C, a mechanism 200 for two-speed operation in a battery-operated hand-held blender will now be discussed. The mechanism 200 includes a battery cartridge 202 configured to receive batteries 204. The battery cartridge includes a first end 201 and a second end 203. The battery cartridge 202, for example, is designed to receive four AA-sized batteries 204 having 1.5 volts each; however, the invention is not so limited. The batteries 204 are internally wired to produce a direct current having a total voltage of approximately six volts. The battery cartridge 202 further includes terminals 206 and 208 at the second end 203. The terminals 206, 208 extend outwardly from the second end 203 of the battery cartridge 202. The battery cartridge 202 is removably received inside the housing 16. The battery cartridge 202 further includes a protrusion 210 that is encompassed by a collar 212. The protrusion 210 and collar 212 are integrally molded with the battery cartridge 202. The cylindrically shaped protrusions 210 and collar 212 define a spring-receiving portion 214 that is also cylindrical in shape. The spring-receiving portion 214 is adapted to receive a helical first spring 216. The first spring 216 is sized such that when the first spring 216 is inserted into the spring-receiving portion 214, the first spring 216 is retained therein in a friction fit engagement. Other means such as adhesives or a catch may be employed to affix the first spring 216 to the battery cartridge 202. The mechanism 200 includes a second spring 218. The second spring 218 is mounted on the exterior surface of the collar 212. The second spring 218 is sized to be slightly smaller than the outer surface of the collar 212 such that when the second spring 218 is mounted on the collar 212, the second spring 218 is slightly expanded to create a biasing force against the collar 212 to engage the exterior surface of the collar 212 and to be retained thereto in a friction-fit engagement.

As described above, the housing 16 includes a motor 15 that rotatably drives the collet 20 and the processing tool 14 attached thereto. The blender 10 includes motor locating ribs 219 that hold the motor 15 in place. A circuit board 221 that is electrically connected to the motor 15 is located between the motor 15 and the battery cartridge 202 and is centered about the motor bearing cap 220. The circuit board 221 includes a resilient first contact 222, a resilient second contact 223, a third contact 224 and at least one resistor 225. First resilient contact 222 is located above third contact 224 as shown in FIGS. 22 and 23.

The battery cartridge 202 is fitted with the first spring 216 by tightly wedging it into the spring-receiving portion 214. The second spring 218 is then mounted to the exterior surface of the collar 212. Batteries 204 are then inserted into the cartridge 202. With the top of the blender housing 16 removed, the battery cartridge 202 is inserted into the housing 16. The first spring 216 contacts the motor housing 220 spacing the battery cartridge 202 such that the cartridge terminals 206, 208 do not contact the first contact 222 and the second contact 223 as shown in FIG. 23A. The actuator 18 is captured within a retainer ring 19 to close the housing 16 in a snap-fit engagement. The battery cartridge 202 is thereby secured inside the housing 16.

To activate the blender 10, the actuator 18 is depressed. Depressing the actuator 18 pushes the battery cartridge 202 downwardly to a first position in which the first spring 216 is compressed and the terminals 206, 208 contact the first and second resilient contacts 222 and 223, respectively, as shown in FIG. 23C. Power is thereby delivered to the motor 15 when such contact is made and the motor 15 is actuated. Resilient first contact 222 is electrically connected to a first motor terminal 227 through a resistor 225. Resilient second contact 223 is electrically connected to a second motor terminal 229. When the battery terminals 206, 208 make contact with first contacts 222, 223, a voltage equal to the battery voltage less the voltage drop across the resistor 225 is delivered to the motor 15 as illustrated by the equation $V_{motor}=V_{battery}-(R_{resistor} \times I_{motor})$. Therefore, less than the full battery voltage is delivered to the motor and the motor operates at a lower speed setting while the battery cartridge 202 is in the first position.

To operate the blender 10 at higher speeds, the actuator 18 is further depressed. Depressing the actuator 18 further downwardly, pushes the battery cartridge 202 further downwardly. Because the resilient contact 222 is resilient, it will flex back and forth like a spring. When flexed downwardly, resilient contact 222 contacts the third contact 224 to define a second position. When the first resilient contact 222 contacts the third contact 224, the resistor 225 is shunted out of the circuit and the full battery voltage is delivered to the motor 15 resulting in the motor 15 running at a higher speed than when a lower voltage was delivered to the motor 15 when the resistor 225 was in the circuit with the battery cartridge 202 in the first position. The second contact 223 being resilient also flexes downwardly and springs back upwardly as shown in FIG. 23. In a variation in which the second contact 223 does not flex, the second cartridge terminal 208 would have to be sufficiently flexible such that terminal 208 would contact second contact 223 throughout the first and second positions.

In order to make it more obvious to the user that the operation shifts from low speed to high speed, the second spring 218 is engaged when the battery cartridge 202 is pushed beyond the first position. The first spring 216 is longer than the second spring 218 as shown in FIG. 22. However, the invention is not so limited and the first spring 216 need only extend a greater distance from the second end 203 of the battery cartridge 202 relative to the second spring 218. The user will notice that additional force is required to press actuator 18 past the first position. This additional force due to the resistance provided by the second spring 218 indicates shifting of the rotational speed of the motor.

A light emitting diode 226 is also connected, physically and electrically to the printed circuit board 221. The light emitting diode 226 is activated when the battery terminals 206, 208 make electrical contact with the printed circuit contacts 222, 223. Alternatively, the light emitting diode 226 is activated when the high speed is chosen.

Releasing pressure on the actuator 18 allows the spring forces generated by first and second springs 216, 218 to push the battery cartridge 202 upwardly away from the motor 15 and circuit board 221. Since contact 222 is resilient, it will flex back towards a relaxed position away from the third contact 224 and current will flow through the resistor 225 in this first position wherein the resulting rotational speed of the motor is slower due less voltage being delivered to the motor 15. In this way, the user can conveniently operate the blender 10 between the two speeds, pressing and releasing the actuator 18 between the first and second positions to achieve the variation in speed. Further relaxation of actuator 18, will drive the battery cartridge 202 further upwardly via the spring force from the first spring 216 until the terminals 206 and 208 no longer contact the contacts 222, 223, thereby, cutting-off current from the motor.

While the present invention has been described with reference to one or more particular variations, those skilled in the art will recognize that many changes may be made thereto without departing from the spirit and scope of the present invention. Each of these embodiments and obvious variations thereof are contemplated as falling within the spirit and scope of the claimed invention, which is set forth in the following claims.

What is claimed is:

1. A blender comprising:
    a processing tool;
    a housing;
    a motor located within the housing; the processing tool being coupled to the motor to be rotatably driven by the motor; the motor includes a first motor terminal and a second motor terminal;
    a battery cartridge located within the housing; the battery cartridge adapted to receive at least one battery; the battery cartridge having a first end and a second end; the battery cartridge including a first cartridge terminal and a second cartridge terminal at the second end;
    a actuator coupled to the first end of the battery cartridge;
    a circuit board located between the motor and the battery cartridge; the circuit board being adapted to electrically connect to the at least one battery to power the motor; the circuit board including a resilient first contact, a resilient second contact; a third contact, and at least one resistor; wherein the resilient first contact is electrically connected to the first motor terminal through the resistor, the resilient second contact is electrically connected to the second motor terminal; the third contact is electrically connected to the first motor terminal; the resilient first contact being located above the third contact;
    a first spring attached to the battery cartridge; the first spring extending from the second end of the battery cartridge;
    wherein the battery cartridge is spaced from the circuit board by the first spring such that the blender is not activated;
    wherein depressing the actuator compresses the first spring to a first position in which the first cartridge terminal and the second cartridge terminal are in contact with the resilient first contact and the resilient second contact, respectively, to activate the motor to rotate the processing tool at a first speed;

wherein depressing the actuator further compresses the first spring further to a second position in which the resilient first contact is flexed to contact the third contact to activate the motor to rotate the processing tool at a second speed; the second speed being greater than the first speed due to the resistor being shunted out of the circuit when the resilient first contact contacts the third contact.

2. The blender of claim 1 wherein the battery cartridge includes a protrusion and a coaxial collar encompassing the protrusion to define a spring-receiving portion therebetween; the first spring being secured in the spring-receiving portion.

3. The blender of claim 2 further including a second spring; the second spring extending from the second end of the battery cartridge by a shorter distance relative to the first spring; wherein the second spring is coaxial relative to the first spring; the second spring being secured to the collar; the second spring is engaged when in the second position.

4. The blender of claim 2 wherein releasing pressure on the actuator allows the spring force generated by the first spring to push the cartridge away from the motor such that the resilient first contact flexes towards a first position in which the resilient first contact does not contact the third contact; the first and second cartridge terminals contacting the resilient first contact and the resilient second contact to at the first speed.

5. The blender of claim 4 wherein further releasing pressure on the actuator allows the spring force generated by the first spring to push the cartridge further away from the motor such that at least one of the first and second cartridge terminals does not contact at least one of the resilient contacts.

6. The blender of claim 1 further including a second spring; the second spring extending from the second end of the battery cartridge by a shorter distance relative to the first spring such that the second spring is engaged when in the second position.

7. The blender of claim 1 wherein the second cartridge terminal is resilient such that it flexes when contacting the second contact.

8. A blender comprising:

a housing;

a motor located within the housing and configured to receive a processing tool to be rotatably driven by the motor;

a battery cartridge located within the housing; the battery cartridge adapted to receive at least one battery; the battery cartridge having a first end and a second end; the battery cartridge including at least one cartridge terminal at the second end;

an actuator coupled to the first end of the battery cartridge;

a circuit board located between the motor and the battery cartridge; the circuit board being adapted to selectively electrically connect to the at least one battery to power the motor;

a first spring extending from the second end of the battery cartridge;

wherein the battery cartridge is nominally spaced from the circuit board by the first spring such that the blender is not activated;

wherein depressing the actuator compresses the first spring to a first position in which the at least one cartridge terminal is in contact with at least one contact of the circuit board to activate the motor to rotate the processing tool at a first speed;

wherein depressing the actuator further compresses the first spring further to a second position in which the at least one cartridge terminal is in contact with at least a second contact of the circuit board to activate the motor to rotate the processing tool at a second speed; the second speed being greater than the first speed.

9. The blender of claim 8, further comprising:

a resistor:

Wherein when the at least one cartridge terminal is in contact with the at least a first contact of the circuit board, power from the battery is provided to the motor through the resistor while, when the at least one cartridge terminal is in contact with the at least a second contact of the circuit board, the resistor is shunted out of the circuit so that the second speed is greater than the first speed.

* * * * *